(12) United States Patent
Moyer

(10) Patent No.: US 6,519,684 B1
(45) Date of Patent: Feb. 11, 2003

(54) LOW OVERHEAD METHOD FOR SELECTING AND UPDATING AN ENTRY IN A CACHE MEMORY

(75) Inventor: William C. Moyer, Dripping Springs, TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/447,254

(22) Filed: Nov. 23, 1999

(51) Int. Cl.[7] .............................................. G06F 12/00
(52) U.S. Cl. ........................... 711/134; 711/3; 711/205; 711/210
(58) Field of Search ..................... 711/117, 118, 711/133, 134, 135, 137, 141, 144, 145, 146, 203, 204, 205, 206, 207, 208, 209, 210, 213, 215, 221, 3; 365/49

(56) References Cited

U.S. PATENT DOCUMENTS

| | | | | | |
|---|---|---|---|---|---|
| 4,910,656 | A | * | 3/1990 | Scales et al. | 711/144 |
| 5,893,142 | A | * | 4/1999 | Moyer et al. | 711/125 |
| 5,913,228 | A | * | 6/1999 | Bedarida | 711/117 |
| 5,920,890 | A | * | 7/1999 | Moyer et al. | 711/141 |
| 5,995,420 | A | * | 11/1999 | Hesley | 326/52 |
| 6,047,354 | A | * | 4/2000 | Yoshioka et al. | 365/49 |
| 6,078,995 | A | * | 6/2000 | Bewick et al. | 711/118 |
| 6,092,172 | A | * | 7/2000 | Nishimoto et al. | 711/203 |
| 6,145,057 | A | * | 11/2000 | Arimilli et al. | 711/118 |
| 6,148,370 | A | * | 11/2000 | Kobayashi | 711/104 |
| 6,366,978 | B1 | * | 4/2002 | Middleton et al. | 365/49 |
| 6,412,043 | B1 | * | 6/2002 | Chopra et al. | 711/118 |

* cited by examiner

Primary Examiner—Do Hyun Yoo
Assistant Examiner—Christian P. Chace
(74) Attorney, Agent, or Firm—James L. Clingan, Jr.

(57) ABSTRACT

A cache memory system (e.g., a translation-lookaside buffer 100) utilizing a reduced overhead entry selection process for overwriting and updating entries. The disclosed embodiment of the present invention uses a match bit, a detection operation (such as a status probe operation), and an efficient control mechanism to identify a particular translation in a translation-lookaside buffer 100 to be updated or overwritten. Based on the results of the probe operation, the match bit is selectively set or cleared. Next, a control mechanism selects one of two possible indices 110 and 114 (locations) in the translation-lookaside buffer 100 to perform a write operation. The first index 110 corresponds to an existing entry, while the second index 114 corresponds to a random entry to be overwritten. The selection process is essentially completed in a single step via dedicated logic. In this manner, overhead associated with selecting an entry to be updated is minimized.

20 Claims, 4 Drawing Sheets

LOW OVERHEAD METHOD FOR SELECTING AND UPDATING AN ENTRY IN A CACHE MEMORY

FIELD OF THE INVENTION

The present invention relates to memory systems and, more particularly, to an improved method and apparatus for selecting and updating an entry in a translation-lookaside buffer (TLB) or other cache memory.

BACKGROUND OF THE INVENTION

Today's high performance data processing systems rely upon sophisticated memory management systems to translate logical addresses into real (physical) addresses. Logical addresses are the software addresses used by the programmer when writing software. Physical addresses are the hardware addresses used by the semiconductor chips and electronic circuitry running the software.

In a very simple microprocessor-based system, the central processing unit (CPU) is linked directly to memory. With this type of configuration, no memory mapping or task protection capabilities are provided, and the addresses generated by the CPU directly identify the physical locations to be accessed. This type of system, however, is unsuitable for multiple-task operations since there is no protection to prevent corruption of memory used by one task during execution of another.

A memory management unit (MMU) with one or more translation-lookaside buffers (TLBs) is often used to provide the address mapping and the task protection needed to construct a multi-tasking data processing system. The MMU acts as an interface between the CPU and the physical memory. The MMU controls all accesses to physical devices, and tasks can be prevented from accessing the memory resources used by other tasks. When under the control of an operating system with virtual memory capabilities, the logical-to-physical mapping functions allow tasks to utilize the entire address space of the CPU to build a memory system as large as the CPU address space without detailed knowledge of the physical characteristics of the system.

The logical address is generated by an instruction unit or a data unit of the CPU and is received as an input by the MMU. The MMU, using one or more TLBs, performs address translation and privilege checking for the logical address and, if the mapping is valid, drives the corresponding physical address to the data or instruction cache or some other type of memory. Note that the corresponding physical address produced by a TLB may be used to access either data or an instruction, depending upon whether the TLB is part of a data memory unit or part of an instruction memory unit.

Generally, a MMU contains one or more TLBs which are used to perform address translation and privilege checking. The MMU may also contain one or more cache memories that store actual data or instructions. Each entry in the TLB usually contains a logical address, a corresponding physical address, and one or more protection or control bits (collectively called attribute bits or attributes).

Typically, a TLB includes a content addressable memory portion (CAM), a random access memory portion (RAM), and associated control circuitry. The CAM is organized in a number of lines with each line capable of storing a logical address and each line including a corresponding match line. On each operation of the TLB, an incoming logical address is received by the TLB and compared to the logical addresses stored in the CAM. If the logical address matches a stored logical address, a TLB translation "hit" (also called a "match") occurs, and the corresponding match line of the CAM produces a valid match signal.

Generally, each line of the CAM couples to a particular portion of the RAM and the enablement of a particular match line causes the RAM to produce a corresponding physical address. When the CAM does not contain the requisite logical address, a translation "miss" (also called "no match") occurs, and a hardware state machine or a software routing is invoked to search main memory in order to determine the physical address that corresponds to the received logical address. This search is often called a "table search" or a "table walk" because it may require the data processing system to access and read more than one memory table stored in MAIN memory.

The main advantage of a TLB is that it saves a great deal of processing time. Rather than having to access tables in main memory every time a translation is required, the data processing system can quickly access the TLB and receive the correct physical address for certain selected logical addresses. However, TLB management (particularly when performed by software) must be minimized in order to fully realize the benefits of a virtual memory system.

In particular, the overhead required to update a TLB entry following an exception contributes directly to a loss in overall system performance, and it is thus desirable to minimize such overhead. In existing solutions, software (e.g., a "miss" handler) generally determines whether an existing entry is to be modified, or whether a new entry needs to be created. Following a miss, the miss handler also traverses the translation architecture to update the selected TLB entry with information from a translation table.

More specifically, when updating a TLB entry via software, the entry is selected based upon the known presence or absence of a corresponding entry which may be present in the TLB. The software must determine whether an existing entry is to be modified, or whether a new entry needs to be created in order for the TLB to remain consistent and to avoid multiple entries with the same logical to physical mapping, but differing access permissions. Prior solutions for updating TLB entries have generally involved a significant amount of software overhead.

BRIEF DESCRIPTION OF THE DRAWINGS

The present invention is illustrated by way of example and not limitation in the accompanying figures, in which like references indicate similar elements, and in which.

DETAILED DESCRIPTION

Figure 1:
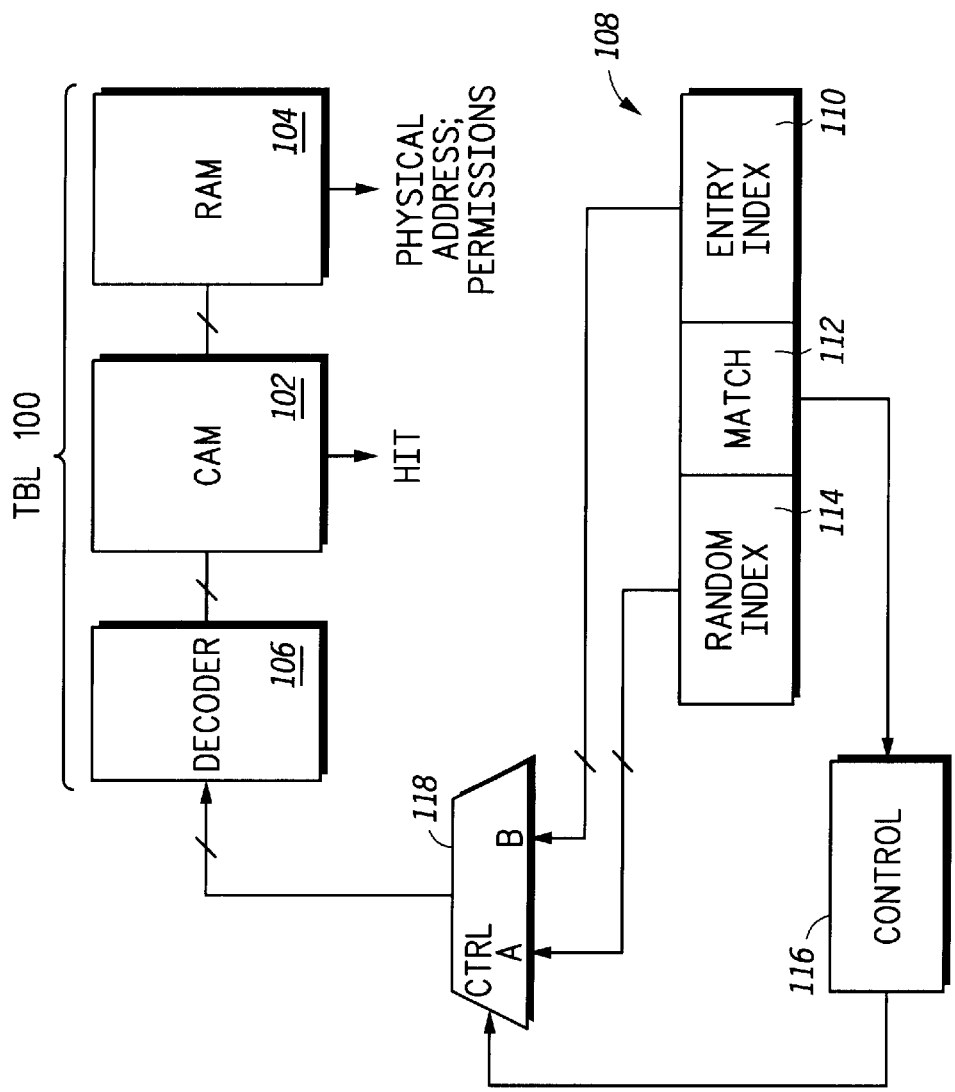
FIG. 1 is a block diagram of a representative portion of a cache memory system utilizing an efficient method for updating a cache entry in accordance with the present invention.

FIG. 1 is a block diagram of a representative portion of a cache memory system utilizing an efficient method for updating a cache entry in accordance with the present invention. The cache memory system of the illustrated embodiment is a translation-lookaside buffer (TLB) 100. Although referred to as a TLB, the TLB 100 is a type of cache memory, and many different cache architectures are contemplated for use with the disclosed invention. In addition, the term "entry" refers to a translation which is present in the TLB 100. Entries may be visible to software processes through load instructions, store instructions, semaphore instructions, probe operations, etc.

The disclosed cache memory system permits software to easily determine whether an existing entry in the TLB 100 should be selected when changing access permissions or logical to physical address translations for a given logical page of memory. Unlike prior solutions, software is not required to test and utilize the result of a TLB 100 status probe operation. Both the execution time and the code size of the software handler responsible for maintenance of the TLB 100 is thereby reduced, resulting in improved overall system performance.

The disclosed embodiment of the present invention uses a match bit, a detection operation (such as a status probe operation), and an efficient control mechanism to identify a particular translation in a TLB 100 to be updated or overwritten. Based on the results of a TLB probe operation in which the TLB 100 is searched for a matching entry, the flag bit (i.e., a match bit) is selectively set or cleared. Next, a control mechanism selects one of two possible indices (locations) in the TLB 100 to perform a TLB write operation. The first index corresponds to an existing entry, while the second index corresponds to a newly selected random entry to be overwritten. The selection process is essentially completed in a single step via dedicated logic. In this manner, overhead associated with selecting an entry to be updated is minimized.

Referring more specifically to FIG. 1, the illustrated TLB 100 comprises a content addressable memory portion (CAM) 102, a random access memory portion (RAM) 104, and an associated address decoder 106. As previously noted, in a TLB implementation the CAM 102 is organized in a number of CAM entries 200 (FIG. 2) capable of storing a logical address. Similarly, the RAM 104 is organized with a number of RAM entries 202 (FIG. 2), each of which is capable of storing a physical address and associated permissions corresponding to a virtual address in the CAM 102. The decoder 106 functions in a similar manner to the decoder circuitry of a typical RAM memory.

The TLB 100 may be a fully associative cache memory, although other architectures may be used with the present invention. In addition, the TLB 100 of the disclosed embodiment of the invention is part of a memory management unit (MMU) integral with a CPU, although it is contemplated that the TLB 100 may be associated with other system components.

In the disclosed embodiment, the decoder 106 is provided with a selection index from an index register 108 via a multiplexer 118 (also referred to herein as a "coupler"). The selection index identifies a particular entry in the CAM 102. In an exemplary embodiment, the CAM 102 includes 64 entries identifiable by a 6-bit selection index following decoding by the decoder 106.

The index register 108 contains entry information recorded by the MMU when an MMU detected exception occurs or when an invalidate TLB entry or probe operation is performed. The index register also provides a random index value to assist in entry replacement. More particularly, the index register includes an entry index field 110, a match flag or match bit 112, and a random index field 114. When a TLB hit results in an MMU detected exception, or permission violation, or when a TLB invalidate entry or probe operation results in a tag match, the entry number (e.g., 63-0) of the matching TLB entry is copied to the entry index field 110. On a TLB miss, or if no exception, invalidate entry or probe operation occurs, the entry index field 110 is unaffected.

In the disclosed embodiment, the value in the random index field is updated or incremented each time a virtual to physical address translation is performed. Alternatively, the value in the random index register may be decremented on each clock cycle or may be regenerated on each clock cycle or predetermined set of clock cycles.

When the TLB hit results in an MMU detected exception or permission violation, or when the TLB invalidate entry or probe operation results in a tag match, the match bit 112 is set. On a TLB miss, following a TLB probe, or following a TLB invalidate entry command, the match bit 112 is cleared. A contemplated format for the index register 108 is provided below:

| | 31–16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|
| R W | | 0 | 0 | 0 | Random Index | | | | | Match | 0 | Entry Index | | | | | |
| reset | | | | | 0 | 0 | 0 | 0 | 0 | 0 | | | | | | | |

The random index field 114 is utilized as part of a replacement algorithm for selecting a new entry to be replaced or overwritten following a TLB miss. Use of the random index field 114 in the replacement process generally requires less hardware overhead than other replacement strategies such as a least recently used (LRU) based method, although such other methods may be utilized in conjunction with the present invention.

The entry index value 110 and the random index value 114 are provided individually to the inputs of a 2:1 multiplexer 118. The multiplexer 118 receives a control input from a control operation or a control circuit 116. Of note, the control circuit 116 utilizes the value of the match bit 112 to automatically determine which of the inputs to the multiplexer 118 is provided as a selection index to the decoder 106.

The automated operation of the control function 116 is particularly advantageous following an exception occurring upon an attempt to write to a write-protected address. As previously noted, a set of access permissions is commonly associated with each physical address. As will be appreciated by those skilled in the art, attempts to store write data to a particular memory location may not be allowed by the associated permission information. A write protect handler may be invoked if the system attempts to write to a protected address, or if the system needs to track writes to a particular memory location. The write protect handler may be required to update the permission information in the TLB 100 to allow a successful write operation.

Likewise, if a page referenced by virtual address is not currently in physical memory, an exception occurs, and the memory manager of the operating system is executed to rectify the situation. Execution of either a write protect handler or miss handler may cause further exceptions or interrupts. During the time in which such exceptions are being handled, for example, it is possible that the state of entries in the TLB 100 may change. For this reason, a probe operation is typically performed before TLB 100 entries are updated. The probe command functions to update the entry index field 110, as well as the match bit 112. This process is described more fully below in conjunction with FIG. 4.

Figure 2:
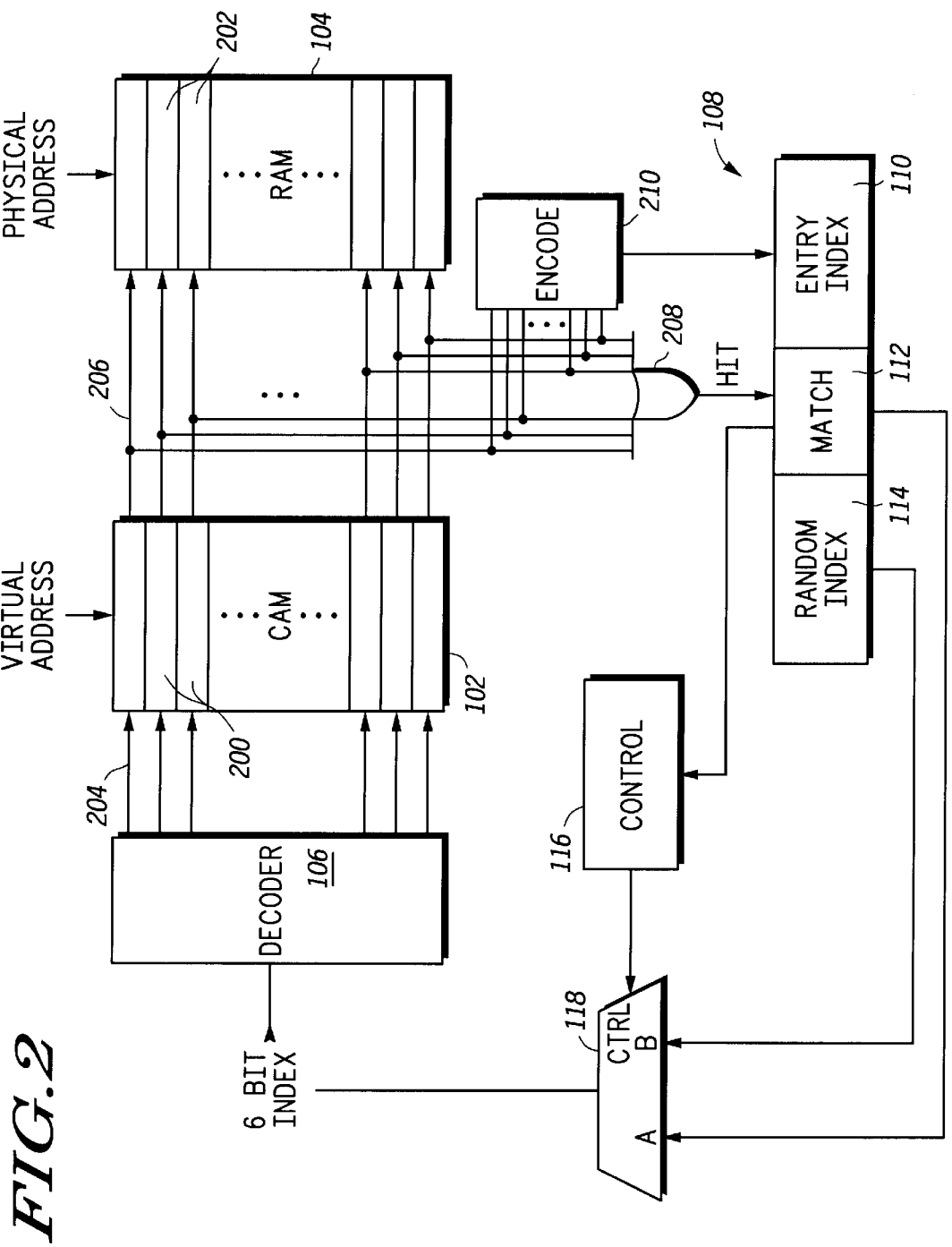
FIG. 2 is a block diagram providing exemplary details of the cache memory system of FIG. 1.

FIG. 2 is a block diagram providing exemplary details of the cache memory system of FIG. 1. In the disclosed embodiment, the CAM portion 102 of the TLB 100 contains a plurality of CAM entries 200, each of which may contain a virtual address. Each of the CAM entries 200 corresponds to a particular physical address in a RAM entry 202 of the RAM portion 104 of the TLB 100. Following provision of 6-bit index value to the decoder 106, a corresponding N-word line 204 is asserted to select a particular one of the CAM entries 200 in the N-entry CAM 102 to be updated.

If a CAM entry 200 contains a value matching the relevant virtual address, the appropriate match line 206 is asserted and a physical address value is either updated or provided to a system bus. Typically, each of row of RAM data (a RAM entry 202) is selected by a specific match line. Each match line 206 is provided to one input of a multi-input OR gate 208 in the conceptualized architecture of the illustrated embodiment. Thus, if any of the match lines 206 is asserted, a hit signal will be asserted at the output of the OR gate 208. The value of the hit signal is then stored as a value in the match bit 112.

In addition, the match lines 206 are provided to an encoder 210, which functions to provide an entry index value corresponding to a valid matching CAM entry 200. Under certain conditions, the entry index value generated by the encoder 210 is copied to the entry index field 110 of the index register 108. Additional components of the TLB 100 (such as write control circuitry) have been omitted for sake of clarity. As will be readily appreciated by those skilled in the art, numerous modifications may be made to the illustrated circuitry without departing from the spirit of the invention. For example, the cache utilized as part of the present invention may comprise a traditional TAG comparison input coupled to a TAG input register.

Figure 3:
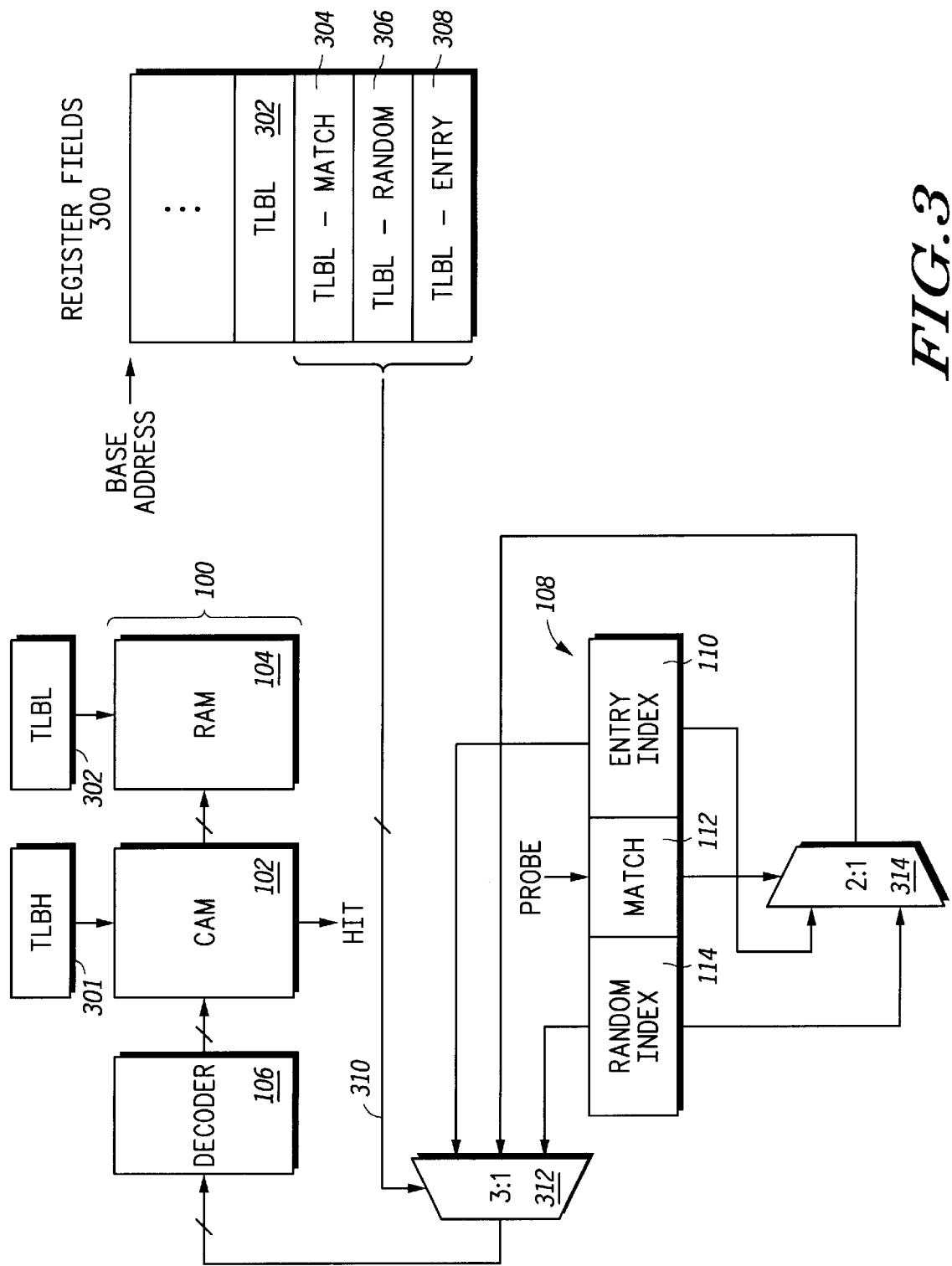
FIG. 3 is a block diagram providing exemplary conceptual details of a circuit according to the present invention for selectively updating a cache entry.

FIG. 3 is a block diagram providing exemplary conceptual details of circuitry according to one embodiment of the present invention for selectively updating a TLB entry. In this embodiment, values stored in a set of latches or virtual register fields 300 control the multiplexing function used to expedite selection and updating of a TLB entry.

Access to entries in the TLB 100 may be accomplished by a pair of registers TLBH 301 and TLBL 302. In the disclosed embodiment of the invention, a write operation to the TLBL register 302 initiates an update of the high and low portions of a TLB entry with the contents of the TLBH register 301 and TLBL register 302.

The TLBL low register (TLBL) 302 is used to hold lower entry information (physical address, control and permission bits) following a read or probe of a TLB 100 entry, and may be written to store a new entry value or update an existing entry. A contemplative format of the TLBL register 302 is shown below. The format conforms to the format for a TLB RAM entry 202.

| 31 30 29 | | | 10 9 8 7 6 5 4 3 2 1 0 |
|---|---|---|---|
| R W Reset | 0 0 | Physical Page Address | 0    Permission Controls |

When performing read or write operations to the TLB 100 via the TLBL register 302 and TLBH register 301, the virtual address is not used as a matching indicator to drive the appropriate match line 206 (or word line). Instead, the decoder 106 is used to drive the desired word line 204 for the CAM 102 and RAM 104. Thus, although not explicitly illustrated, the match lines 206 of the CAM 102 may be logically OR'ed with the word lines 204 output by the decoder 106 to write to the RAM 104.

Updating of the TLB 100 is affected by which of three addresses in the register fields 300 is written by an update (or similar) operation. Two of the addresses, TLB_RANDOM 306 and TLB_ENTRY 308, update the TLB 100 in a predefined manner using the random index field 114 and entry index field 110, respectively. The third address, TLB_MATCH 304, performs an update that is dependent on the result of a previous probe operation. In this instance, the match bit within the TLB register determines which of the two fields are used to accomplish an update. The probe operation interrogates or attempts to perform a match within the TLB 100 by examining the value in the TLBH register 301. The value of the resulting hit signal is latched into the match bit 112.

More specifically, a write to TLB_RANDOM 306 updates the entry pointed to by the random index field 114 in the index register 108. A write operation to TLB_ENTRY updates the TLB entry pointed to by the entry index field 110 of the index register 108. A write to the TLBL_MATCH 304 location updates the TLB entry pointed to by the entry index field 110 of the index register 108 if the match bit 112 is set, otherwise it updates the TLB entry pointed to by the random index field 114 of the index register 108. Thus, a memory system according to the present invention is capable of quickly updating an existing TLB entry or selecting a new entry when an existing entry is not present, without first having to examine the status of a match flag to determine if an entry exists.

In operation, use of the register fields 300 to control the selection of a TLB entry to be updated can be conceptualized by the operation of multiplexers 312 and 314. More specifically, the multiplexer 314 receives as inputs both the value stored in the entry index field 110 and the value stored in the random index field 114 as inputs. Selection of the output of the multiplexer 314 is determined by the value of the match bit 112. As previously noted, the value of the match bit 112 may be set by probe operation following a permission violation or other exception. In prior solutions, the update handler or other software responsible for updating TLB entries would be required to read and test the values stored in the match bit 112, and then enact a conditional branch operation based on the ascertained value. In the present invention, however, the need for these steps is obviated.

Instead, the output of the multiplexer 314 is provided as an input into the three input multiplexer 312, which also receives the entry index value 110 and random index value 114 as inputs. The value provided to the decoder 106 is determined by the address location 304, 306 or 308 written to in the register fields 300. In the case of a write to the TLBL_MATCH register 304, the output of the multiplexer 314 is automatically provided to the decoder 106, removing the necessity of the software to examine the match bit 112 in order to update a TLB entry.

Figure 4:
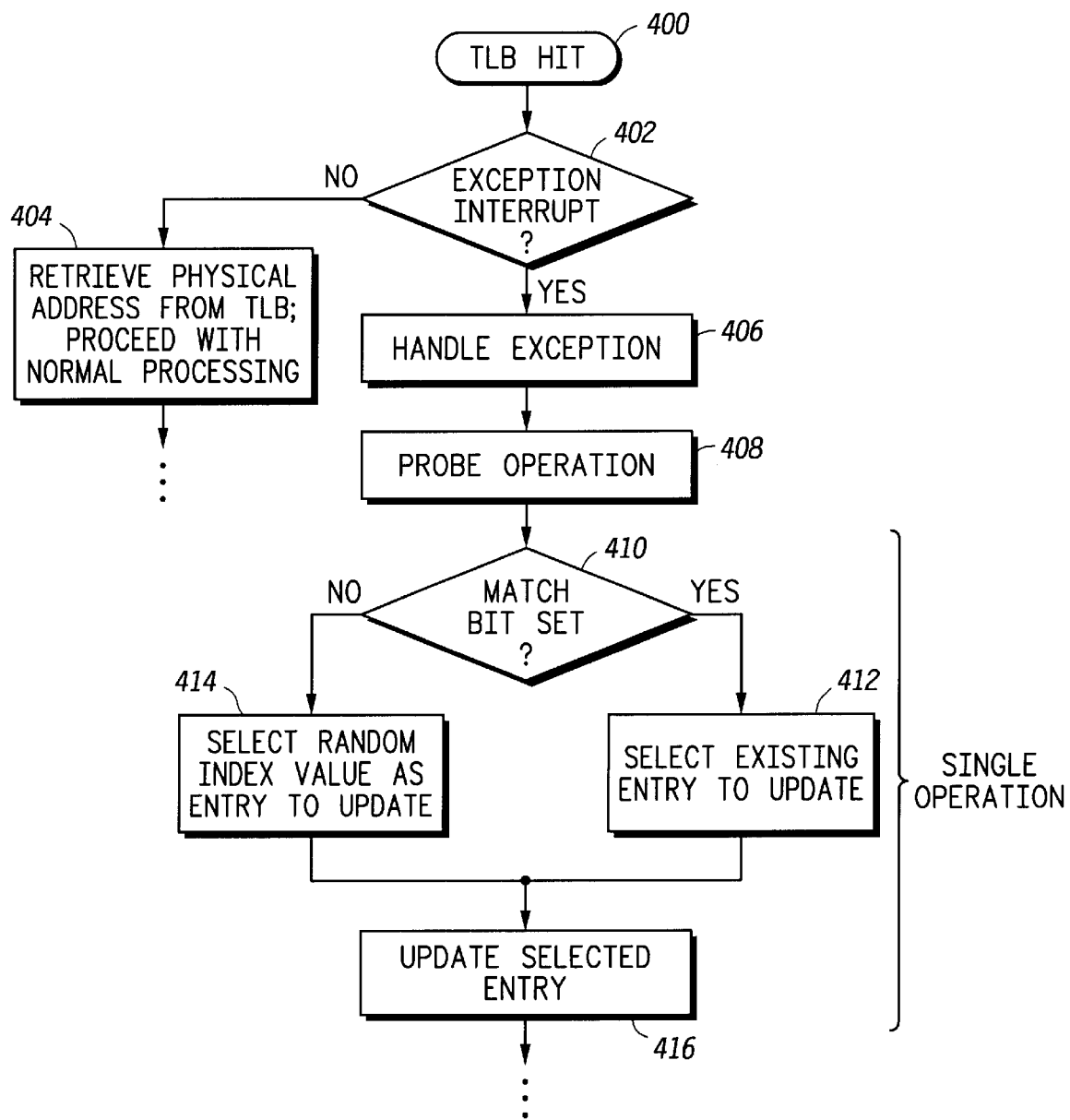
FIG. 4 is a flow diagram of an exemplary method according to the present invention for selectively updating a cache entry.

FIG. 4 is a flow diagram of an exemplary method according to the present invention for selectively updating a cache entry. The method commences following a TLB hit in step 400. The permission information of an associated physical address is next examined in step 402 to determine if a permission violation giving rise to an exception or interrupt has occurred. If not, the method proceeds to step 404 and the physical address is provided to the system by the TLB 100. The system then proceeds with normal processing utilizing the address translation information.

If an exception or interrupt has occurred as determined in step 402, an appropriate write protect handler or exception handler is invoked in step 406 in an attempt to resolve any potential problems. During the execution of such software handlers, it is possible that one or more TLB entries may become invalid or experience a change in permission values, including the TLB entry currently being utilized. Following completion of step 406, a probe operation is therefore next performed in step 408 to determine if updated permission values are present. In addition, the probe operation of step 408 functions to update the match bit 112 and entry index field 110 of the index register 108. The random index field 114 may also be updated, if necessary.

Next, in step 410, the status of the match bit 112 is determined by control circuitry operating in accordance with the present invention. If the match bit is set as determined in step 410, the process proceeds to step 412 and the TLB 100 entry corresponding to the entry index field 110 is selected to be updated. If the match bit is not set, the process instead proceeds to step 414 and the TLB 100 entry corresponding to the value in the random index field 114 is selected to be updated. Following either of steps 412 or 414, the selected entry is updated in step 416. Address information and permission values may be updated at this point. Of note in the present invention, steps 410–416 are effectively performed as a single operation, without the requirement of additional software overhead to examine the value stored in the match bit 112. The method of FIG. 4 may be performed by circuitry such as that illustrated in FIGS. 1–3, although numerous variations are possible.

Thus, a cache memory system (e.g., a translation-lookaside buffer 100) utilizing a reduced overhead entry selection process for overwriting and updating entries has been described. The selection process is essentially completed in a single step via dedicated logic. In this manner, overhead associated with selecting an entry to be updated is minimized.

Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

I claim:

1. A circuit, comprising:
    a cache memory having an index input and a match output;
    a match signal storage location coupled to the match output of the cache;
    a first storage location for storing a first index value;
    a second storage location for storing a second index value; and
    a multiplexer having a first data input coupled to the first storage location, a second data input coupled to the second storage location, a control input coupled to the match signal storage location, and an output for providing index values to the index imput.

2. The circuit of claim 1, wherein the first storage location stores a cache entry index value.

3. The circuit of claim 2, wherein the second index value is for selecting an entry to be replaced.

4. The circuit of claim 3 further comprising a control logic circuit for coupling the match signal storage location to the control input of the multiplexer.

5. The circuit of claim 4 wherein a register contains the match storage location, the first storage location, and the second storage location.

6. The circuit of claim 1, wherein the second index value is for selecting an entry to be replaced.

7. The circuit of claim 6 further comprising a control logic circuit for coupling the match signal storage location to the control input of the multiplexer.

8. The circuit of claim 7 wherein a register contains the match storage location, the first storage location, and a second storage location.

9. The circuit of claim 1 further comprising a control logic circuit for coupling the match signal storage location to the control input of the multiplexer.

10. The circuit of claim 9 wherein a register contains the match storage location, the first storage location, and a second storage location.

11. The circuit of claim 1 wherein a register contains the match storage location, the first storage location, and a second storage location.

12. In a cache having an index input, a method comprising the steps of:
    determining if there is a match in the cache in response to an address and providing a match signal in response;
    storing the match signal to provide a stored match signal at a first logic state if there is a match;
    in response to determining a match, identifying a corresponding index for the address;
    storing the corresponding index to provide a stored corresponding index address;
    coupling the stored corresponding index to the index input of the cache in response to the stored match signal being at the first logic state.

13. The method of claim 12, further comprising:
    storing the match signal to provide the stored match signal at a second logic state if there is not a match in the cache in response to the address;

generating a random index;

storing the random index to provide a stored random index; and coupling the stored random index to the index input of the cache in response to the stored match signal being at the second logic state.

14. In a cache having an index input and special condition bits, a method comprising the steps of:

determining if there is a match in the cache in response to an address;

in response to there being a match, determining if the special condition bits indicate a special condition;

in response to determining the special condition bits indicate a special condition, performing special operations;

after performing the special operations, determining if there is a match in the cache in response to the address and providing a match signal in response thereto;

storing the match signal to provide a stored match signal at a first logic state if there is a match;

in response to determining a match, identifying a corresponding index for the address;

storing the corresponding index to provide a stored corresponding index address; and coupling the stored corresponding index to the index input of the cache in response to the stored match signal being at the first logic state.

15. The method of claim 14, further comprising:

storing the match signal to provide the stored match signal at a second logic state if there is not a match in the cache in response to the address;

generating a first index for selecting an entry to be replaced;

storing the first index; and coupling the first index to the index input of the cache in response to the stored match signal being at the second logic state.

16. The circuit of claim 15, wherein the first index is a random value.

17. A circuit comprising:

a cache having an index input, a TAG comparison input, a data output, and a match output;

a TAG input register, coupled to the TAG comparison input, a match storage location, coupled to the match output, for storing a match signal at a first logic state if the match output indicates that a match has occurred;

an entry index storage location; and a coupler, coupled to the match storage location and the index storage location, which couples the index storage location to the index input of the cache in response to the match signal being at the first logic state.

18. The circuit of claim 17 further comprising a random index storage location coupled to the coupler.

19. The circuit of claim 18 wherein the match storage location is further characterized as storing the match signal at a second logic state if the match output indicates that the match output has not occurred.

20. The circuit of claim 19, wherein the coupler is further characterized as a multiplexer which couples the random index storage location to the index input of the cache in response to the match signal being at a logic low.

* * * * *